United States Patent [19]

Gary

[11] Patent Number: 4,489,787

[45] Date of Patent: Dec. 25, 1984

[54] ANGLED ROLLING KNIVES AND METHOD OF WEEDING

[75] Inventor: David A. Gary, O'Donnell, Tex.

[73] Assignee: William A. Russ, Tahoka, Tex. ; a part interest

[21] Appl. No.: 441,679

[22] Filed: Nov. 15, 1982

[51] Int. Cl.³ .................. A01B 39/08; A01B 39/14
[52] U.S. Cl. ........................ 172/1; 172/574; 172/602; 172/526; 172/561
[58] Field of Search ............... 172/169, 522, 526, 574, 172/575, 562, 561, 602, 49.5, 59, 196, 166, 603, 1

[56] References Cited

U.S. PATENT DOCUMENTS

| | | | |
|---|---|---|---|
| 420,051 | 1/1890 | Gale | 172/602 |
| T862,011 | 5/1969 | Koronka | 111/88 |
| 975,109 | 11/1910 | Baldwin | 172/522 X |
| 1,545,895 | 7/1925 | Hamilton | 172/561 |
| 1,598,625 | 9/1926 | Todd | 172/522 |
| 1,627,277 | 5/1927 | Craig | 172/603 |
| 2,268,055 | 12/1941 | Neisingh | 172/574 |
| 2,363,268 | 11/1944 | Schiel | 172/575 X |
| 2,414,507 | 1/1947 | Callahan | 172/304 X |
| 2,549,185 | 4/1951 | Fitch | 172/575 X |
| 2,757,593 | 8/1956 | Bowman | 172/603 |
| 3,129,773 | 4/1964 | Freeman | 172/522 |
| 3,830,047 | 8/1974 | Asumendi | 172/526 X |
| 4,409,912 | 10/1983 | Koronka | 172/196 |

FOREIGN PATENT DOCUMENTS 730579  5/1932  France .................. 172/561

Primary Examiner—Richard J. Johnson
Attorney, Agent, or Firm—Wendell Coffee

[57] ABSTRACT

For cutting the roots of weeds in agricultural fields, rolling knives in the form of flat, circular plates with sharp, peripheral edges are journaled to struts connected to a tool bar drafted in a direction of draft. The knives rotate about knife axes that are normal to knife planes containing their sharp edge. All knife axes are about 45° from vertical. For bedded fields, the rolling knives are preferably connected to the tool bar in knife sets of two for each soil bed, with the knives of each set engaging opposite sides of each bed. As the rolling knives roll within the soil, their sharp edges sever the roots of weeds. In an alternate embodiment, a vertical stabilizer plate is rolled opposite each rolling knife to stabilize the soil therebetween. In another embodiment, each strut includes a hinge that has a hinge axis substantially within the knife plane. The knives swing about the hinge axes and trail in the direction of draft following the path of least resistance through the soil. The angles of the knife axes with respect to vertical are adjusted between 40° and 50° with various shaped shims inserted between angled foot pieces and hinge plates, or by substitution of footpieces with different angles. A scraper is attached to each strut to scrape soil from the knife or stabilizer plate sides.

6 Claims, 11 Drawing Figures

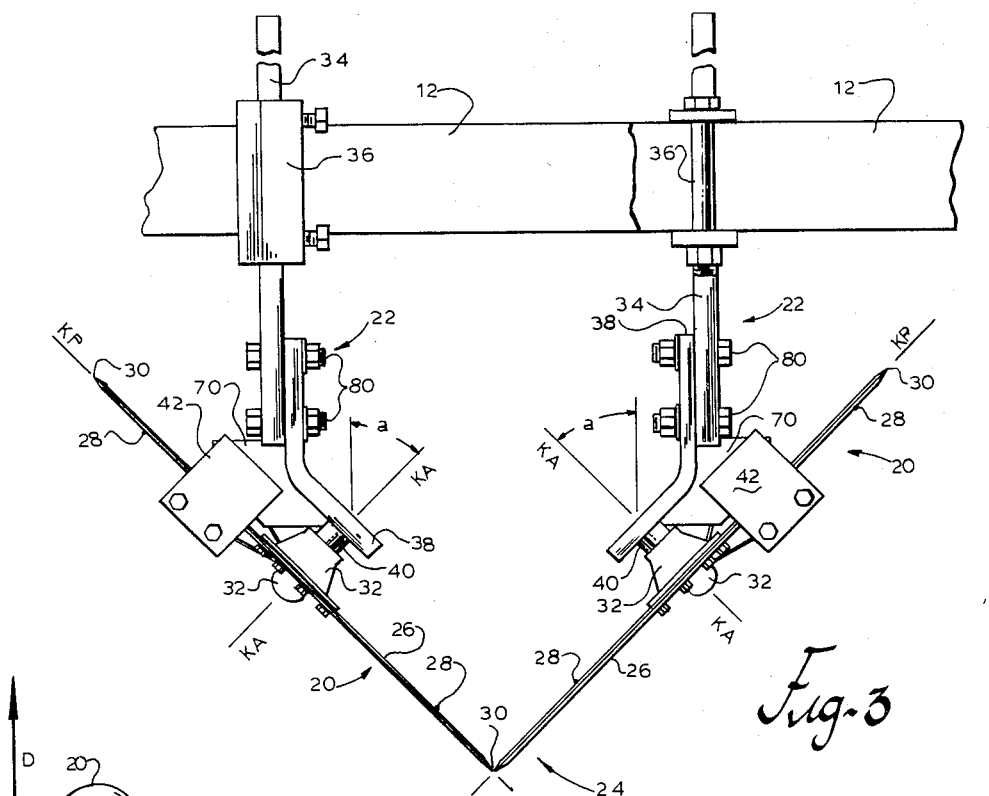
Fig-3
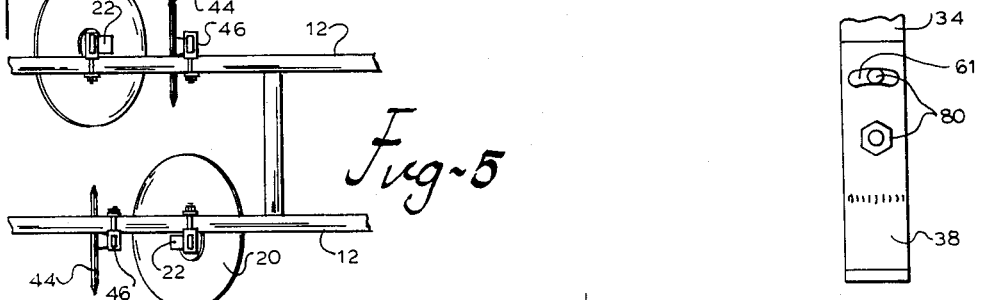
Fig-5
Fig-11
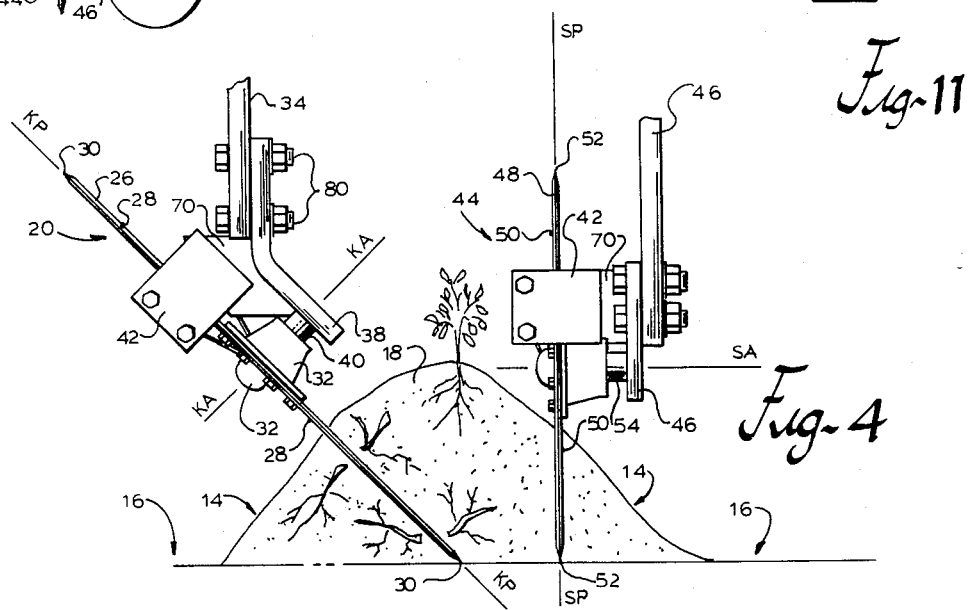
Fig-4

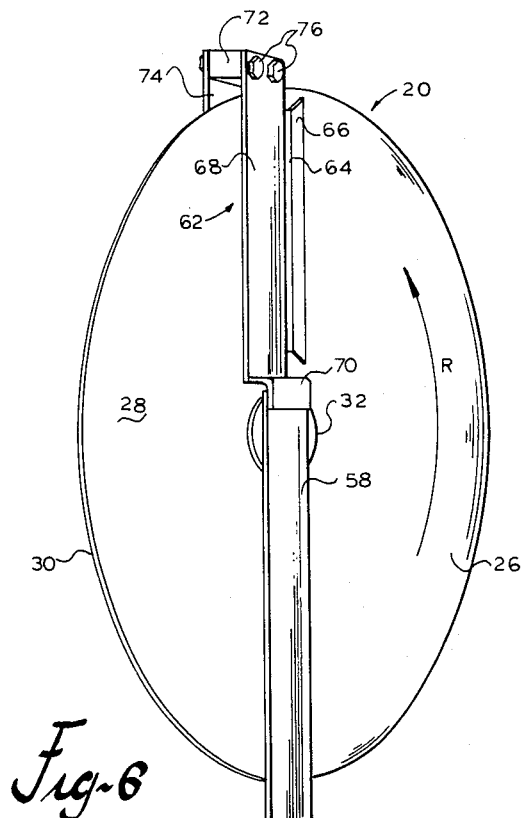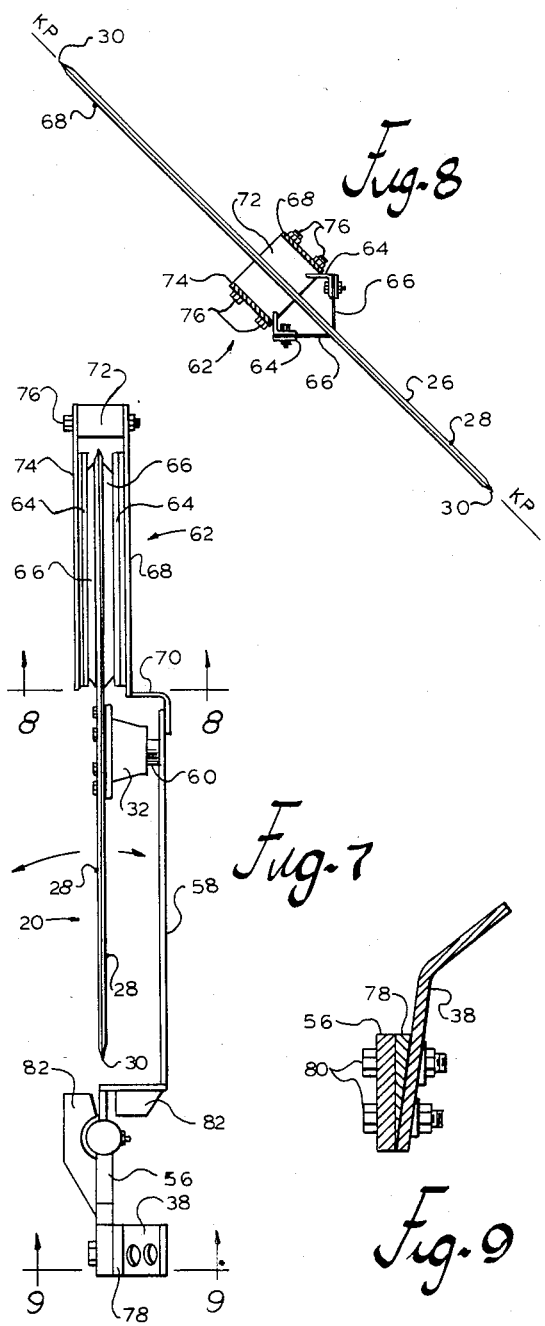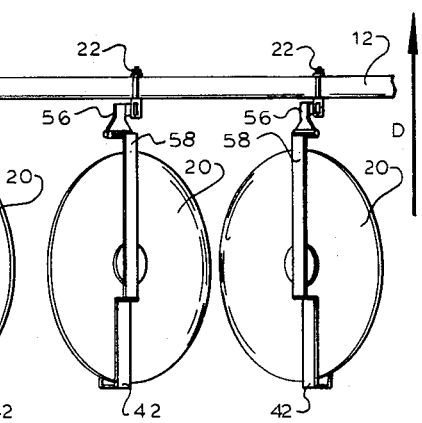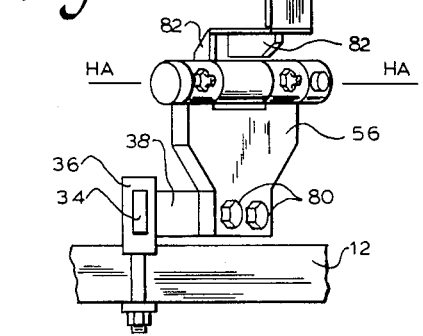

ANGLED ROLLING KNIVES AND METHOD OF WEEDING

BACKGROUND OF THE INVENTION (1) Field of the Invention

This invention relates to agriculture and more particularly to drafted implements for cutting the roots of weeds.

(2) Description of the Prior Art

In the growing of crops, it is ordinarily desirable to prevent the growth of weeds therein. Some weeds grow from seeds, while other come up from roots. In many cases, herbicides may be used to control weeds. Unfortunately, herbicides are somewhat ineffective against root weeds. Because the roots of root weeds are deep within the soil, it is difficult to get the herbicide in contact with the weed root. It is also difficult to kill root weeds with herbicides without adversely affecting the crop as well. Bed planting, wherein soil is turned over and piled to form soil beds, serves to exacerbate the root weeds problem by concentrating such weeds in the beds.

Before my invention, rigid, horizontal, sword-like knives were ripped through the soil to cut the weed roots. As the swords were ripped through the soil, weeds, dirt, and other material tended to collect on the swords, thereby increasing the friction and disturbance of the soil. Many crops are adversely affected by such soil disturbances. The large soil friction factor resulted in a requirement for substantial amounts of draft power to drag the swords through the soil. Additionally, weeds collecting on the leading edges of the swords increase friction with the soil, and later dislodge during the movement through the soil, tending to spread the weed roots through the beds.

Another method of mechanically controlling root weeds is by shallow cultivation. Manual hoeing will cut the root weeds very close to the soil surface. Sword knife, or sweep plow, cultivators may be used with less draft power by dragging the sword knives, or sweep, just under the soil surface, much as with hoeing. Tandem disc plows or other shallow cultivators may also be employed to cut the weed roots near the soil surface. Such shallow cultivation methods produce unacceptable soil disturbance. Additionally, the closer the weed root is to the soil surface, the sooner it will emerge and have adverse effect on the crop. Therefore, such shallow weed cultivation methods must be repeated frequently during the course of the crop growth to be minimally effective.

Before this application was filed, a search was made in the United States Patent and Trademark Office. That search developed the following United States patents:
POULE, U.S. Pat. No. 719,863
SMART, U.S. Pat. No. 804,631
BUSCH, U.S. Pat. No. 1,161,109
PSENCIK, U.S. Pat. No. 1,172,046
SCHIEL ET AL, U.S. Pat. No. 2,363,268
SCHLUETER, U.S. Pat. No. 2,651,905
ADAMS, U.S. Pat. No. 2,864,297
BEAMAN ET AL, U.S. Pat. No. 3,058,531
JOHNSON, U.S. Pat. Re. 9,168

SUMMARY OF THE INVENTION (1) New Functions and Surprising Results

I have solved the problems described above by inventing a device and method of operation which combines individual elements such as plates with sharp edges, axles, struts, hinges, shims, scrapers, etc., and steps such as rolling such plates with sharp edges through soil beds at an angle to sever weeds therein etc. to achieve the unusual and surprising results of better root weed control with less draft power required.

My invention is described hereinafter primarily in application to bedded fields for purposes of clarity. Those skilled in the art will unuerstand that my invention is also applicable to flat fields with neither furrow nor beds.

A rolling knife according to my invention is formed by a circular plate having flat sides, a sharp peripheral edge and a knife plane substantially containing the sharp edge. Each knife is journaled to a strut for rotation about a knife axis normal to the knife plane. The struts are mountable on or connectable to a tool bar that is drafted in a direction of draft behind a tractor. When connected to the tool bar, the struts position each of the knife axes at an angle of about 45° from vertical. The angle of the knife axes is adjustable between 35° and 55° from vertical. Each of the knives has a scraper mounted on the strut thereof to maintain the knife sides free of clinging soil.

In operation, the rolling knives are engaged with the soil, and the tool bar is drafted in a direction of draft. As the tool bar is drafted, each knife easily rolls its sharp edge through the soil at the selected angle thereby severing the roots of weeds in its path. For bedded soil, the rolling knives are most advantageously employed in sets of two, for each bed, with a knife on each side of the bed.

My invention effectively severs the roots of weeds at greater depth, with less soil disturbance, and with less required draft power.

The beneficial result of cutting roots deep within the soil is that the weed growth is retarded for a much longer period than with shallow cultivation methods. Additionally, the rolling knife will not transport weeds to other parts of the field as with the prior art shallow cultivators. Therefore, root weed growth is more effectively retarded with my invention than with the weed control methods of the prior art.

Most crops are adversely affected by soil disturbance and aeration of the soil after planting. My invention minimizes such soil disturbance and aeration, because the thin rolling knife slices through the soil with minimal friction. The scrapers maintain the knife sides free of irregular clumps of dirt and weeds etc., to ensure that friction with the soil between the soil and the knife sides is minimal.

Disturbance of soil in the beds may be further minimized by the addition of vertical stabilizer plates directly opposite, and aligned with the rolling knives, such that the stabilizer plates and the rolling knives engage opposite sides of the soil beds, to sandwich the soil in the bed therebetween. The stabilizer plates "back up" the rolling knives to stabilize, or hold stationary, the soil within the bed between the knife and the stabilizer plates as the weed roots are severed.

I have found it desirable to adjust the angles of the knife axes to account for variations in knife diameter, soil conditions, crop type, and weed type. For a decreased knife axis angle from vertical, a larger diameter rolling knife plate must be substituted to obtain the former horizontal soil bed penetration and deeper vertical penetration below the bed centers.

My invention also incorporates a hinged connection in the strut, such that the knife moves about a hinge axis that is substantially within the knife plane. In this way, the angle of the knife axis from vertical is substantially maintained while permitting movement of the knife to maintain the knife axis normal, and the knife plane parallel, to the direction of draft. Whereas the hinge embodiment automatically maintains the knife plane parallel to the direction of draft, the fixed embodiment is manually adjusted prior to drafting the knives to maintain the knife plane in proper orientation.

Thus, all embodiments of my invention will result in a minimum of soil disturbance and are easily drafted.

The hinge embodiment facilitates initial insertion of the rolling knives into the soil. The tool bar and hinge are lowered, thereby causing the rolling knives resting on the soil surface, to swing about the hinge axis so that the knife axes are no longer normal to the direction of travel. As the tool bar is drafted, the force exerted on the knives through the hinges will force the knife axes to a position normal to the direction of draft, thereby forcing the rolling knives into the soil. Therefore, the hinge embodiment of my invention forms self-engaging rolling knives.

Thus it may be seen that the total function and results achieved by my combination far exceed the sum of the functions of the individual elements such as plates with sharp edges, axles, struts, hinges, angled members, scrapers, etc.

(2) Objects of this Invention

An object of this invention is to sever the roots of weeds within agricultural fields.

Further objects are to achieve the above with a device that is sturdy, compact, durable, easily drafted, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 3 is a rear elevation view of a knife set of two rolling knives.

FIG. 4 is a rear elevation view of a rolling knife with a bed stabilizer.

FIG. 5 is a top plan view of a knife set with bed stabilizers, simplified for clarity.

FIG. 6 is a top plan view of an angled rolling knife including a hinged strut connected to a tool bar.

FIG. 7 is a top edge view of the rolling knife shown in FIG. 6 taken along the knife plane thereof.

FIG. 8 is a section view of a scraper on the knife taken substantially along line 8—8 of FIG. 7.

FIG. 9 is a section view showing the angle adjustment shim, taken substantially along line 9—9 of FIG. 7.

FIG. 10 is a top plan view showing the hinged rolling knife shown in FIG. 6 in the preferred mounting on a tool bar, simplified for clarity.

FIG. 11 is a side elevational view of the connection of the footpiece to the shank shown in FIG. 3.

DESCRIPTION OF THE PREFERRED EMBODIMENTS

Figure 1:
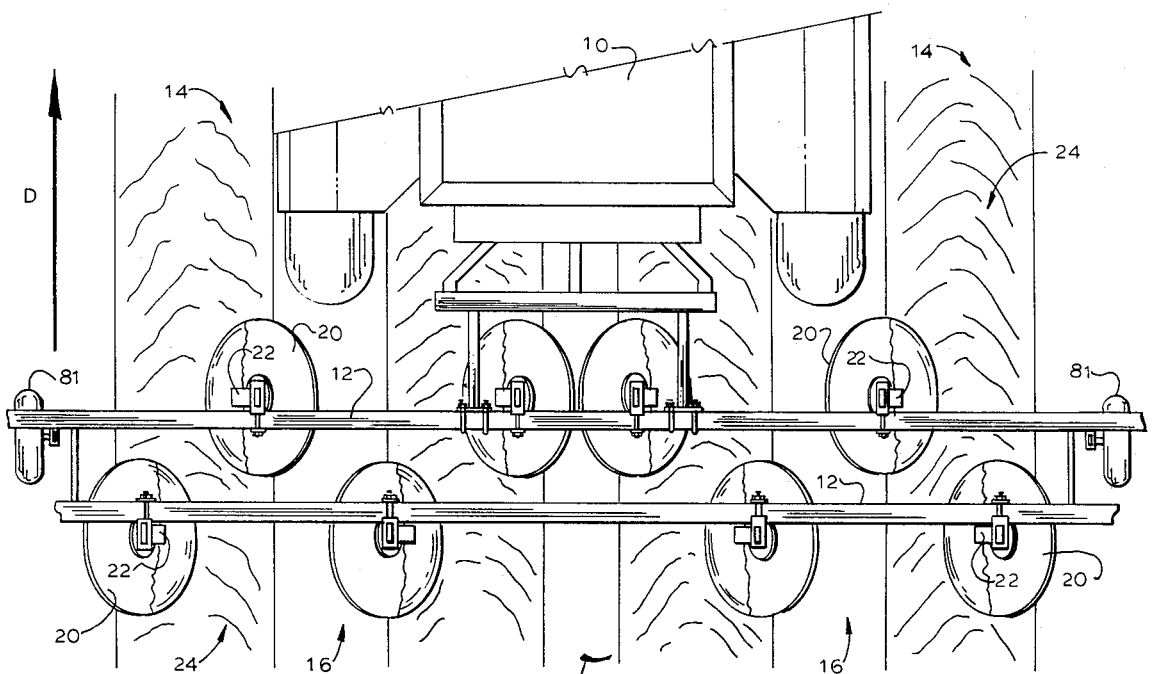
FIG. 1 is a top plan view of a weeder employing rolling knives according to my invention shown drafted behind a tractor along beds, simplified for clarity.
Figure 2:
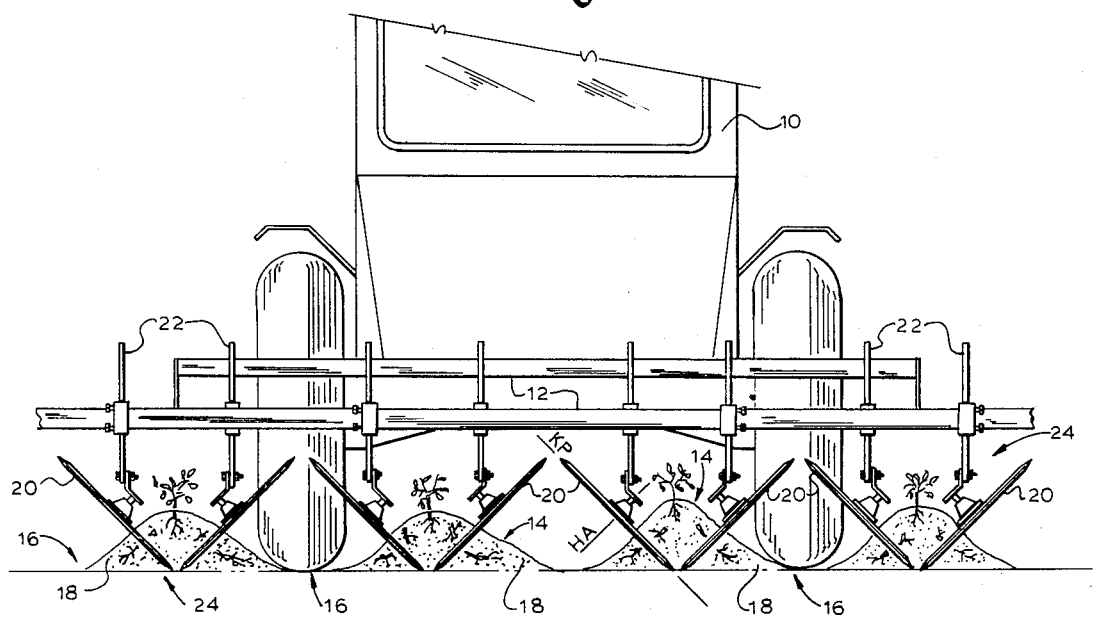
FIG. 2 is a rear elevation view of the rolling knife weeder shown in FIG. 1.

Referring to FIGS. 1 and 2, tractor 10 is shown drafting tool bar 12 along soil beds 14 between furrows 16 in soil 18 in a direction of draft D. For bedded fields, the beds and furrows are extended in the direction of draft. For flat fields without substantial furrows or raised beds, the line of crop plants are extended along the direction of draft.

Rolling knives 20 are journaled to struts 22. The struts 22 are mounted on the tool bar 12 in knife sets 24, such that two of the rolling knives 20 are positioned on either side of each of the beds 14. Referring to the embodiment shown in FIG. 1, the rolling knives 20 of each knife set 24 are staggered along the beds 14. The soil 18 is sometime shown in phantom line in the drawings to illustrate the positions of the rolling knives 20. The staggered arrangement avoids interference between rolling knives 20 and permits using rolling knives 20 of larger diameter than would be possible if the knives 20 were directly opposite each other.

Referring to FIG. 3, each of the rolling knives 20 includes circular knife plate 26 with flat knife sides 28, circular knife edge 30, and knife hub 32. Knife plane KP substantially contains the knife edge 30.

The struts 22 include strut shanks 34 connected at upper ends thereof to the tool bar 12 by shank clamps 36, footpieces 38 connected to lower ends of the strut shanks 34 and axles 40 connected to the footpieces 38. The footpieces 38 are bent such that when the strut shanks 34 are depended vertically from the tool bar 12, and the footpieces 38 affixed to the lower end of strut shank 34, one portion of the footpieces 38 will be connected to the strut shank 34 and the other portion of the footpieces 38 will angularly project from the strut shank 34. The axles 40 are connected normal to the angled projections of the footpieces 38.

The knife plates 26 are journaled at the knife hubs 32 to the axles 40 for rotation of the knife plates 26 within their knife planes KP about knife axes KA. Each footpiece 38 is angled so that the knife axes KA are about 45° from vertical. For this embodiment, the knife axis angles may be changed by substituting other footpieces with different angles for the footpieces 38 shown in FIG. 3. The interchangeable footpieces and the various angles form angle adjustment means for adjusting the knive axis angle. A knife axis angle, a, greater or less than 45° from vertical may be required for various soil conditions, knife diameter, crop types, and weed types. I have found that a range of knife axis angles, a, of 40° to 50° from vertical is satisfactory to account for most variations in conditions. However, given the appropriate combination of soil conditions, knife diameter, crop type, and weed type, knife axis angles of between 35° and 55° from vertical may be advantageously employed.

Each of the rolling knives 20 has scraper 42 mounted on its strut 22. The scrapers 42 are not shown in FIGS. 1, 2, and 5 for purposes of clarity.

Referring to the alternate embodiment shown in FIGS. 4 and 5, vertical bed stabilizers 44 are journaled to stabilizer struts 46. The bed stabilizers 44 include flat, stabilizer plates 48 having flat stabilizer sides 50, flat, circular, sharp, peripheral stabilizer edge 52, and a stabilizer plane SP substantially containing the stabilizer edge 52. Each bed stabilizer is journaled to its strut 46 by stabilizer axle 54 for rotation of the bed stabilizer 44 within the vertical stabilizer plane SP about horizontal stabilizer axis SA. The struts 46 are mounted on the tool bar 12 such that the bed stabilizers 44 are directly opposite and across the beds from the rolling knives 20. The bed stabilizers 44 and the rolling knives 20 sandwich the soil in the beds 14 therebetween. As the rolling knives 20 roll through the soil beds 14, the bed stabilizers 44 stabilize or prevent movement of soil in the bed. Additionally, the sharpened edges of the bed stabilizers 44 facilitate engagement of the soil and sever horizontally extending roots that would not be severed by the rolling knives 20.

Each of the struts 46 has one of the scrapers 42 mounted thereon to remove soil and mud from the sides of the bed stabilizers 44. Referring to FIGS. 4 and 5, the diameter of the stabilizer plates 48 is less than the diameter of the knife plates 26. The vertical depth to which the rolling knives 20 engage the soil, however, is approximately the same as the depth engaged by the stabilizer plates 48. Thus the edges 30 and 52 are adjacent.

The use of the bed stabilizers 44 in conjunction with the rolling knives 20, has additional benefits. The rolling knives for this embodiment may be used with more loosely packed soil in the soil beds 14, since the bed stabilizers 44 will prevent displacement of the soil that would tend to occur in loose soil without the stabilizers 44. I have found weed roots may be cut below growing crops without killing the crop because the knives neither disturb the soil nor aerate the soil.

FIGS. 6, 7, and 10 show trailing self-engaging, rolling knives according to my invention. Each strut may be seen to include, in addition to the footpieces 38, hinge plate 56 hinged to strut beam 58. The rolling knives 20 are journaled to the strut beams 58 by axles 60. The axles 60 are attached as by welding to the beams 58. The footpiece 38 is shown on either side of the hinge plate 56 in FIGS. 6 and 7 to show that either position may be used.

Referring to FIGS. 6 and 7, the movement of the rolling knife 20 with respect to the hinge plate 56 will be about a hinge axis HA. The force exerted on the rolling knife 20 through the strut 22 will be minimized when the knife plane KP is parallel to the direction of draft. Therefore, it may be seen that the hinge axis HA is substantially within the knife plane KP. With the hinge axis HA in this position, the rolling knife will trail behind the hinge plate 56 with the knife plane KP parallel to the direction of draft D, with minimum soil disturbance. For example, if the rolling knives shown in FIG. 10 are deflected to the right, the increased pressure (which will result in soil disturbance) on the right knife side 28 will force the rolling knives 20 back into alignment directly behind the hinge axis HA in the direction of draft (with minimum soil disturbance).

The fixed knives 20 (FIGS. 1-5) are manually adjusted to set the knife planes parallel to the direction of draft. Footpiece 38 (FIG. 11) has slot 61 therein, which allows the knife axis to be pivoted to a position normal to the direction of draft, thereby setting the knife plane parallel thereto.

Referring to FIGS. 7 and 8, each scraper includes scraper bracket 62, which includes blade frames 64 with scraper blades 66. Scraper bar 68 is connected at one end to the footpiece 38 or beam 58 by scraper brace 70 therebetween. The scraper bar 68 extends from the footpiece 38 (or beam 58) parallel to knife sides 28 and beyond the knife edge 30. Scraper block 72 is bolted between the scraper bar 68 and scraper bar 74. The scraper bar 74 extends from the scraper block 72 adjacent the other knife side 28 to a point proximate the knife hub 32. The scraper bar 74 is not connected to the knife hub and is disconnectable from the scraper block 72 by block bolts 76 to facilitate removal and installation of the rolling knives 20. The scraper bars 68 and 74, scraper block 72, scraper brace 70, block bolts 76 and blade frames 64, together form the scraper bracket 62.

Blade frames 64 are welded to the scraper bars 68 and 74 to form rigid, angled mounting surfaces for the scraper blades 66 that extend parallel and proximate to the knife sides 28. The scraper blades 66 are bolted to the blade frames 64 so that they springably bear against the knife sides 28 at about a 45° angle thereto. The rolling knives 20 rotate about the knife axis KA in a direction of rotation R that is opposite the direction of draft D at the knife edge 30 engaged with the soil. The inclination of the scraper blades 66 is such that when the knife plates 26 rotate in the direction of rotation R, the edges of the scraper blades 66 are inclined against the direction of rotation R such that the edges of the scraper blades 66 contacting the knife sides 28 are inserted under soil or mud caked on the knife sides 28. I prefer to employ spring steel for the scraper blades 66 to ensure resilient contact with the knife sides 28.

The scraper 42 maintains the knife sides 28 free of irregular clumps of soil and root material that would cause disturbance in and friction with the bed as the knife sides 28 pass therethrough. The scrapers 42 are substantially the same for all knife and stabilizer embodiments shown in the drawing.

Referring to FIGS. 7 and 8, adjustment wedge or shim 78 is positioned between the hinge plate 56 and the footpiece 38, and secured therebetween by shank bolts 80. Other appropriately-shaped shims are substituted for the adjustment shim 78 to adjust the angle of the knife axis KA. The adjustment shim 78, in combination with the hinge plate 56, footpiece 38 and shank bolts 80 provides adjustment means for adjusting the angle of the knife axes with respect to vertical.

The benefit of adjusting the angle of the knife axes KA is that the path of the angled knife plate 28 within the soil is selected thereby. As the angle of the knife axis from vertical is increased, the difference in vertical depth between the knife edge and the point of engagement with the soil bed side is decreased, while the horizontal engagement into the soil bed in increased. The horizontal position of the knife edge 30 may be further varied by sliding the shank clamps 36 along the tool bar 12, for example, to space the cutting edges away from the roots of crop plants. Further vertical adjustment of each knife 20 may be accomplished by sliding the shank 34 up or down within the shank clamp 36. Such changes in position and angle may require changes in the diameters of the knife plates 26.

Although the height of the tool bar 12 and hence the depth of engagement of the knives 20 may be controlled with the power lift on the tractor in level fields, I prefer to use gauge wheels 81 (FIG. 1) for all embodiments.

The gauge wheels 81 keep the tool bar height constant as the tractor moves over bumps and dips in the field.

The benefit of increased vertical depth of engagement with the soil is that the roots of the weeds are cut further below the soil surface, thereby increasing the time required for the weed to grow to the surface. I have discovered that the retardation of weed emergence from the time of cutting for my invention may be more than two months. Longer retardation periods could be obtained using larger diameter knife plates 26 with deeper engagement of the soil 18. In cotton and other crops, a two month retardation period is usually sufficient to obviate the necessity of repeated weed cultivation by hand hoeing or other means for that crop.

Stops 82, shown in FIG. 7, are welded to the hinge plates 56 to limit or restrict the downward movement of the rolling knives 20 about the hinge axes HA. The stop 82 facilitates transportation of the rolling knives connected to the tool bar 12 between cultivation sites and at the end of the beds during turning. To transport the rolling knives as described, the tool bar is raised by hydraulics on the tractor 10. As the tool bar 12 is raised, the strut beams 58 contact the stops 82, thereby also lifting the rolling knives 80.

The operation of my invention may be seen to occur as follows. A plurality of the angled sharp edged knife plates 28 journaled to the struts 22 depended from the tool bar 12 are engaged with opposite sides of the beds 14. Each knife axis of each rolling knife is about 45°, or preferably not more than 50° from vertical. Under extreme circumstances, an angle of 55° might be used. The knife axes about which the rolling knives rotate are normal to the knives 20. It will be understood that the angle of each knife axis need not necessarily be the same, although uniform knife angles are ordinarily preferred. After the soil bed has been engaged by the rolling knives 20, the knives are rolled within the soil bed about the knife axes while the tool bar is drafted or transported in the direction of draft along the soil beds. As the knives roll through the soil beds, the knife edges sever the roots of weeds in their path. The rolling knife plates 26 with smooth sides 28 will encounter minimal resistance and friction, will require less draft power, and will minimize disturbance and aeration of the soil during weed cutting operations.

When the rolling knives 20 are augmented with the vertical stabilizers 44 as described above, the soil beds 14 are engaged by each of the angled knife plates 26 on one side of the soil bed, and by the vertical bed stabilizers 44 aligned with the rolling knives on the other side of the soil beds 14. The bed stabilizers 44 are rolled through the soil beds 14 by the drafting or transportation of the tool bar 12 in the direction of draft. During the severing of the roots by the angled rolling knives 20, the bed stabilizers 44 and the rolling knives 20 stabilize the soil in the bed sandwiched therebetween.

The paths of the rolling knives within the soil bed are selected by adjusting the angles of the knife axes with respect to vertical and the horizontal positions of the axles 40. The horizontal positions of the axles 40 are adjusted by sliding the shank clamps 36 along the tool bar 12. The angles of the knife axes with respect to vertical are adjusted by substitution of various angled footpieces, or by insertion of various angled adjustment shims 78 between the hinge plates 56 and foot pieces 38.

Rolling resistance and soil disturbance are minimized when the knife plate KP is parallel to the direction of draft, and, therefore, when the knife axes are normal to the direction of draft. For example, the line of intersection of each knife plane and a horizontal plane is parallel to the direction of draft when the knife plane is parallel to the direction of draft and the knife axis is normal to the direction of draft. The knife axis is maintained normal to the direction of draft by swinging the knife plates about the hinge axes responsive to changes in direction of draft or forces exerted on the rolling knife by the soil. For example, rolling knives including the hinged struts with hinge axes within, the knife planes of the rolling knives 20, may be used on contoured beds. As the tractor 10 turns to follow the curved contour, the tool bar 12 will not be normal to the direction of draft of the beds. Without the hinges, the rolling knives would turn with the tool bar and unacceptably displace soil from the beds. However, the hinged rolling knives will tend to follow the contour of the beds responsive to the changes in direction of the tractor 10, since the knife planes will be maintained parallel to, and the knife axes normal to, the direction of draft through the beds.

Soil is prevented from collecting on the knife sides with consequent increases in friction and soil disturbance during the rolling of the knives 20 by scraping the clinging soil from the sides of the knife plates continuously during the rolling steps. I have found it necessary to maintain the blades of the scrapers in contact with the knife sides 28 with blades made of spring steel, since scrapers not forcibly contacted with the knife sides 28 will not satisfactorily maintain the knife sides 28 free of clinging mud and soil.

Although my invention has been described above and in the drawing in connection with bedded fields for clarity, it is also applicable to unbedded fields without furrows, or mounded beds elevated above adjacent terrain. The embodiments described above are suitable for unbedded applications.

Those skilled in the art will also be able to connect my invention and the above described embodiments to the numerous tractors, power lifts, and tool bars used in agriculture.

The embodiments shown and described above are only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

10 tractor
12 tool bar
14 soil beds
16 furrows
18 soil
20 rolling knives
22 struts
24 knife sets
26 knife plates
28 flat knife sides
30 knife edges
32 knife hubs
34 strut shanks 36 shank clamps
38 footpieces
40 axles
42 scrapers
44 bed stabilizers
46 stabilizer struts
48 stabilizer plates
50 stabilizer sides
52 stabilizer edges
54 stabilizer axle
56 hinge plates
58 strut beams
60 axles
61 slot
62 scraper bracket
64 blade frame
66 scraper blades
68 scraper bars
70 scraper braces
72 scraper blocks
74 scraper bars
76 block bolts
78 adjustment shims
80 shank bolts
81 gauge wheels
82 stops

I claim as my invention:

1. Ground engaging structure connected to
    a. a tool bar that is draftable behind
    b. a tractor in a direction of draft,
WHEREIN THE IMPROVEMENT COMPRISES:
    c. a plurality of knives in the form of circular knife plates, each having
    d. two flat knife sides,
    e. a sharp, circular, peripheral knife edge,
    f. a knife plane substantially containing the knife edge, and
    g. a knife hub at the center thereof;
    h. a plurality of knife struts, each including
    i. a shank connected at an upper end to the tool bar,
    j. a footpiece attached to a lower end of the shank,
    k. a hinge plate connected to the footpiece,
    l. a strut beam hinged to the hinge plate for movement of the strut beam about a hinge axis,
    m. an axle connected to the strut beam;
    n. each knife being journaled by the axle at the knife hub for rotation of the knife within the knife plane about a knife axis that is normal to the knife plane,
    o. the hinge axis of each strut being substantially within the knife plane of the knife journaled thereto,
    p. the footpieces being angled with respect to the hinge axes such that each hinge axis is not less than 40° from vertical,
    q. the knives being grouped to form at least two knife sets;
    r. the struts to which the knives are journaled being connected to the tool bar such that when the knife sets are engaged with the soil,
    s. the knives of each knife set are opposite, and
    t. the knife planes of each knife set intersect within the soil.

2. The invention as defined in claim 1 with the addition of the following limitations:
    u. at least one stop connected to the strut for restricting movement of the knife about the hinge axis within desired limits.

3. The invention as defined in claim 1 with the addition of the following limitations:
    u. an angle adjustment shim between the hinge plate and the footpiece.

4. The invention as defined in claim 1 with the addition of the following limitations:
    u. the knife having a direction of rotation about the knife axis,
    v. a scraper on each strut beam, including
    w. a scraper bracket connected to the strut and extending adjacent to both knife sides, and
    x. scraper blades mounted on the scraper brackets and springably bearing leading edges of the scraper blades against the knife sides,
    y. the leading edges being oriented against the direction of rotation of the knife sides.

5. The improved method of cutting the roots of weeds in soil comprising the steps of:
    a. engaging the soil with a circular sharp-edged, flat knife plate,
    b. drafting the knife plate in a direction of draft while
    c. swinging each knife plate about a hinge axis that is within the plane of the knife plate, thereby
    d. maintaining the knife axis normal to the direction of draft, while
    e. rolling the knife plate within the soil about a knife axis that is normal to the knife plate and not greater than 50° from vertical, thereby
    f. severing the roots of weeds within the soil with minimal soil disturbance,
    g. said knife engaging one side of a raised bed in the soil,
    h. adjusting the angle of the knife axis by
    i. changing the angle of the hinge axis from vertical, and
    j. adjusting the spacing of the hinge axis from the bed, thereby
    k. selecting the path of the knife plate within the bed.

6. Ground engaging structure connectable to
    a. a horizontal tool bar drafted by
    b. a tractor in a direction of draft,
WHEREIN THE IMPROVEMENT COMPRISES;
    c. a knife in the form of a circular knife plate having
    d. flat knife sides,
    e. a sharp, circular, peripheral knife edge, and
    f. a knife plane substantially containing the knife edge;
    g. the knife being journaled to a strut for rotation of the knife edge about a knife axis that is normal to the knife plane,
    h. the strut being adapted for connection to the tool bar such that when the strut is connected thereto the knife axis is not more than 50° from vertical,
    i. the strut including a hinge for movement of the knife about a hinge axis that is substantially within the knife plane,
    j. a plurality of said knives grouped to form at least two knife sets,
    k. the struts being connected to the tool bar such that when the knives engage the soil,
    l. the knives of each knife set are opposite, and
    m. the knife planes of each knife set intersect within the soil.

* * * * *